United States Patent
Zheng et al.

(10) Patent No.: US 10,085,225 B2
(45) Date of Patent: Sep. 25, 2018

(54) METHOD AND APPARATUS FOR NETWORK SYNCHRONIZATION, COMPUTER PROGRAM PRODUCT FOR PERFORMING THE METHOD AND SYSTEM COMPRISING THE APPARATUS

(71) Applicant: Nokia Solutions and Networks Oy, Espoo (FI)

(72) Inventors: Naizheng Zheng, Beijing (CN); Jianhong Mou, Beijing (CN); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 118 days.

(21) Appl. No.: 15/123,075

(22) PCT Filed: Mar. 21, 2014

(86) PCT No.: PCT/CN2014/073892
§ 371 (c)(1),
(2) Date: Sep. 1, 2016

(87) PCT Pub. No.: WO2015/139315
PCT Pub. Date: Sep. 24, 2015

(65) Prior Publication Data
US 2017/0078985 A1 Mar. 16, 2017

(51) Int. Cl.
*H04W 72/04* (2009.01)
*H04W 56/00* (2009.01)
(Continued)

(52) U.S. Cl.
CPC ........ *H04W 56/001* (2013.01); *H04B 17/336* (2015.01); *H04J 3/0641* (2013.01)

(58) Field of Classification Search
CPC ... H04W 56/001; H04B 17/336; H04J 3/0641
See application file for complete search history.

(56) References Cited

U.S. PATENT DOCUMENTS 9,872,265 B2 * 1/2018 Koorapaty ........ H04W 56/0015
2009/0196277 A1 8/2009 Horn et al.
(Continued)

FOREIGN PATENT DOCUMENTS

| CN | 101605370 | 12/2009 |
|---|---|---|
| CN | 103582108 | 2/2014 |
| EP | 2639982 | 9/2013 |

OTHER PUBLICATIONS

"3rd Generation Partnership Project; Technical Specification Group Radio Access Network; Evolved Universal.Terrestrial Radio Access (E-UTRA); TDD Home eNode B (HeNB) Radio Frequency (RF) requirements analysis (Release 11)", 3GPP TR 36.922, V11.0.0, Sep. 2012, pp. 1-74.
(Continued)

*Primary Examiner* — Jay P Patel
(74) *Attorney, Agent, or Firm* — Nokia Technologies Oy

(57) ABSTRACT

A method for network synchronization of a first network element is provided, comprising: receiving, from each of at least two synchronization candidate network elements, a first synchronization accuracy value; determining, for each of the at least two synchronization candidate network elements, a signal quality indicator; determining for each synchronization candidate network element a second synchronization accuracy value based on the signal quality indicator and the first synchronization accuracy value related to the synchronization candidate network element, and selecting a synchronizing network element, for synchronizing the first network element to, from the at least two synchronization candidate network elements, based on the determined second synchronization accuracy values. The present disclosure enhances the performance of RIB network synchronization by indicating an estimate of an accumulated synchronization error magnitude. The indication is beneficial for RIB source network element or source cell (Continued)

selection and it could help to make the topology of synchronized network elements/cells more reasonable.

18 Claims, 11 Drawing Sheets

(51) Int. Cl.
*H04J 3/06* (2006.01)
*H04B 17/336* (2015.01)

(56) References Cited

U.S. PATENT DOCUMENTS

| | | | |
|---|---|---|---|
| 2010/0074180 A1* | 3/2010 | Palanki | H04W 56/0015 370/328 |
| 2010/0240371 A1 | 9/2010 | Cook et al. | |
| 2010/0260168 A1 | 10/2010 | Gheorghiu et al. | |
| 2013/0010658 A1* | 1/2013 | Zhu | H04W 56/0015 370/280 |
| 2015/0131607 A1* | 5/2015 | Koorapaty | H04L 5/0007 370/330 |
| 2016/0278030 A1* | 9/2016 | Yi | H04W 16/32 |
| 2017/0070968 A1* | 3/2017 | Kim | H04L 27/2613 |

OTHER PUBLICATIONS

"3rd Generation Partnership Project; Technical Specification Group Radio Access Network; Small cell enhancements for E-UTRA and E-UTRAN—Physical layer aspects (Release 12)", 3GPP TR 36.872, V12.0.0, Sep. 2013, pp. 1-78.

"3rd Generation Partnership Project;Technical Specification Group Radio Access Network; Evolved Universal Terrestrial Radio Access Network(E-UTRAN); S1 Application Protocol (S1AP) (Release 8)", 3GPP TS 36.413, V8.6.1, Jun. 2009, pp. 1-218.

"3rd Generation Partnership Project; Technical Specification Group Services and System Aspects; Telecommunication management; Home enhanced Node B (HeNB) Operations, Administration, Maintenance and Provisioning (OAM&P); Information model for Type 1 interface HeNB to HeNB Management System (HeMS) (Release 12)", 3GPP TS 32.592, V12.0.0, Dec. 2013, pp. 1-92.

Extended European Search Report received for corresponding European Patent Application No. 14886042.2, dated Oct. 13, 2017, 7 pages.

International Search Report received for corresponding Patent Cooperation Treaty Application No. PCT/CN2014/073892, dated Dec. 24, 2014, 3 pages.

* cited by examiner

METHOD AND APPARATUS FOR NETWORK SYNCHRONIZATION, COMPUTER PROGRAM PRODUCT FOR PERFORMING THE METHOD AND SYSTEM COMPRISING THE APPARATUS

RELATED APPLICATION

This application was originally filed as PCT Application No. PCT/CN2014/073892 filed Mar. 21, 2014.

TECHNICAL FIELD

The present disclosure generally relates to the field of synchronization of networks, and particularly to methods and apparatuses for network synchronization, computer program products for performing the methods and systems comprising the apparatuses.

BACKGROUND

Network synchronization is essential for TD-LTE systems, and it is beneficial also for FDD-LTE systems if advanced features are utilized, such as eICIC, CoMP, eMBMS, or advanced IC receiver application. Practically, the network synchronization can be achieved with satellite solution (e.g. GPS or GNSS), network backhaul solution (e.g. NTP, SyncE, or PTP), or over-the-air/radio-interface based solution (e.g. Network Listening Mode). For each of the synchronization solutions, there are pros and cons in terms of frequency/phase synchronization accuracy, hardware cost and/or applicability. Radio interface based (RIB) network synchronization has been seen as an option when other synchronization techniques are costly or deemed unavailable due to, for example, lack of satellite coverage (e.g., no GPS/GNSS coverage) or poor quality network backhauling (e.g. with poor quality network backhaul link involving routers and/or switches).

FIG. 1 shows an example diagram of RIB synchronization chain.

When for example a small cell like an eNB/HeNB (e.g., an "unsynchronized cell" 102 as shown in FIG. 1) is powered-up, it will search for radio interface signals from other cells to find a synchronous cell with lowest stratum-level with sufficient SNR as its source cell for synchronization. By knowing the stratum-level of a source cell, the small cell will decide its own stratum-level by simply adding 1 to the stratum level of the selected source above, e.g. if the stratum-level of source cell is n, then stratum-level of the listening small cell is simply n+1. As yet another cell may acquire its synchronization later on from the aforementioned small cell, cells are seen to form synchronization chains.

A typical network synchronization requirement for radio-interface based (RIB) application is 3 µs (or ±1.5 µs) between any two overlapping cells. If the two overlapping cells belong to different synchronization chains, the synchronization error between the root cell (i.e., the cell 101 at stratum 0 in FIG. 1) of a synchronization chain and a small cell (e.g. the "unsynchronized cell" 102 in FIG. 1) at the end of the synchronization chain must be less than half of the requirement value (3 µs/2=1.5 us) in order to guarantee that the network synchronization requirement for RIB application is fulfilled. By considering dense small cell deployment scenario the supported maximum hop level may be further extended to for example even 6 hops or 7 stratum levels. Practically, the number of hops that can be supported for each synchronization chain depends on the synchronization accuracy accumulated over each hop. Based on the legacy RIB scheme, a signal-noise-ratio (SNR) threshold is generally used for each hop in order to guarantee that the synchronization requirement could be met with the maximum number of supported hops.

However, in reality, the choosing of the appropriate SNR threshold will be a difficult task. If a tight SNR threshold is utilized, a maximum number of hops could be supported while ensuring sufficient synchronization accuracy over the whole synchronization chain, but the portion of cells synchronized with RIB will be quite limited due to the tight SNR threshold applied. With a considerable probability, a cell acquiring a RIB synchronization simply cannot find a synchronization source cell with signal quality exceeding the SNR threshold. On the other hand, if a more less tight SNR threshold is used, there will be a higher number of successfully synchronized RIB cells with a stratum level equal or below a certain value. But the uncertainty on the actual synchronization accuracy increases especially for cells with a high stratum level.

SUMMARY

Embodiments of the present invention aim at addressing at least part of the above issues and/or problems and draw-backs.

According a first aspect of the present disclosure, there is provided a method for network synchronization of a first network element, comprising: receiving, from each of at least two synchronization candidate network elements, a first synchronization accuracy value; determining, for each of the at least two synchronization candidate network elements, a signal quality indicator; determining for each synchronization candidate network element a second synchronization accuracy value based on the signal quality indicator and the first synchronization accuracy value related to the synchronization candidate network element, and selecting a synchronizing network element, for synchronizing the first network element to, from the at least two synchronization candidate network elements, based on the determined second synchronization accuracy values.

In a preferred embodiment of the first aspect, the first synchronization accuracy value may be a stratum value of a synchronization candidate network element and the second synchronization accuracy value may be a potential stratum value of the first network element.

In a preferred embodiment of the first aspect, determining the potential stratum value of the first network element may comprise: determining the potential stratum value of the first network element for a synchronization candidate network element by incrementing the stratum value of the synchronization candidate network element by one if the signal quality indicator is above a threshold; and incrementing the stratum value of the synchronization candidate network element by more than one if the signal quality indicator is below the threshold.

In a preferred embodiment of the first aspect, determining the potential stratum values of the first network element may comprise: determining the potential stratum value of the first network element for a synchronization candidate network element by incrementing the stratum value of the synchronization candidate network element by a value that depends inversely on a quantized value of the signal quality indicator.

In a preferred embodiment of the first aspect, selecting the synchronization network element for the first network element may comprise: comparing the determined potential stratum values of the first network element for different synchronization candidate network elements; selecting the synchronization candidate network element with the lowest determined potential stratum value as a synchronization source for the first network element; and setting the stratum value of the first network element to the determined potential stratum value of the first network element for the synchronization candidate network element selected as the synchronization source for the first network element.

In a preferred embodiment of the first aspect, the first synchronization accuracy value may be a synchronization accuracy value of a synchronization candidate network element, and the second synchronization accuracy value may be an accumulated synchronization accuracy value taking the first synchronization accuracy value and the signal quality indicator related to the synchronization candidate network element into account.

In a preferred embodiment of the first aspect, the accumulated synchronization accuracy value for each synchronization candidate network element may be determined by summing the received first synchronization accuracy value for the synchronization candidate network element with an individual synchronization error magnitude value estimated from the determined signal quality indicator for the synchronization candidate network element.

In a preferred embodiment of the first aspect, the individual synchronization error magnitude value may be estimated by using a mapping table.

In a preferred embodiment of the first aspect, different mapping tables may be used for different synchronization candidate network element types.

In a preferred embodiment of the first aspect, the method may further comprise: quantifying the accumulated synchronization accuracy value into a plurality of levels.

In a preferred embodiment of the first aspect, selecting the synchronization network element for the first network element may comprise: comparing the accumulated synchronization accuracy values for the at least two synchronization candidate network elements; and selecting the synchronization candidate network element that has the smallest accumulated synchronization accuracy value.

In a preferred embodiment of the first aspect, the quantified level of accumulated synchronization accuracy value for a selected synchronization network element may be signaled as a synchronization accuracy value by the first network element to at least one further network element for which the first network element can act as a synchronization candidate network element.

In a preferred embodiment of the first aspect, the signal quality indicator may relate to a signal-noise-ratio (SNR) of the received signal.

In a preferred embodiment of the first aspect, the first network element may comprise a first cell and the at least two synchronization candidate network elements may comprise each a candidate cell.

In a preferred embodiment of the first aspect, the method may be used in radio-interface based (RIB) network synchronization.

In a preferred embodiment of the first aspect, the method may be performed in the first network element.

In a preferred embodiment of the first aspect, the first network element may be in an eNB.

According to a second aspect of the present disclosure, there is provided an apparatus for network synchronization of a first network element, comprising: means for receiving, from each of at least two synchronization candidate network elements, a first synchronization accuracy value; means for determining, for each of the at least two synchronization candidate network elements, a signal quality indicator; means for determining for each synchronization candidate network element a second synchronization accuracy value based on the signal quality indicator and the first synchronization accuracy value related to the synchronization candidate network element, and means for selecting a synchronizing network element, for synchronizing the first network element to, from the at least two synchronization candidate network elements, based on the determined second synchronization accuracy values.

In a preferred embodiment of the second aspect, the first synchronization accuracy value may be a stratum value of a synchronization candidate network element and the second synchronization accuracy value may be a potential stratum value of the first network element.

In a preferred embodiment of the second aspect, the means for determining the potential stratum value of the first network element may comprise: means for determining the potential stratum value of the first network element for a synchronization candidate network element by incrementing the stratum value of the synchronization candidate network element by one if the signal quality indicator is above a threshold; and incrementing the stratum value of the synchronization candidate network element by more than one if the signal quality indicator is below the threshold.

In a preferred embodiment of the second aspect, the means for determining the potential stratum values of the first network element may comprise: means for determining the potential stratum value of the first network element for a synchronization candidate network element by incrementing the stratum value of the synchronization candidate network element by a value that depends inversely on a quantized value of the signal quality indicator.

In a preferred embodiment of the second aspect, the means for selecting the synchronization network element for the first network element may comprise: means for comparing the determined potential stratum values of the first network element for different synchronization candidate network elements; means for selecting the synchronization candidate network element with the lowest determined potential stratum value as a synchronization source for the first network element; and means for setting the stratum value of the first network element to the determined potential stratum value of the first network element for the synchronization candidate network element selected as the synchronization source for the first network element.

In a preferred embodiment of the second aspect, the first synchronization accuracy value may be a synchronization accuracy value of a synchronization candidate network element, and the second synchronization accuracy value may be an accumulated synchronization accuracy value taking the first synchronization accuracy value and the signal quality indicator related to the synchronization candidate network element into account.

In a preferred embodiment of the second aspect, the accumulated synchronization accuracy value for each synchronization candidate network element may be determined by summing the received first synchronization accuracy value for the synchronization candidate network element with an individual synchronization error magnitude value estimated from the determined signal quality indicator for the synchronization candidate network element.

In a preferred embodiment of the second aspect, the individual synchronization error magnitude value may be estimated by using a mapping table.

In a preferred embodiment of the second aspect, different mapping tables may be used for different synchronization candidate network element types.

In a preferred embodiment of the second aspect, the apparatus may further comprise: means for quantifying the accumulated synchronization accuracy value into a plurality of levels.

In a preferred embodiment of the second aspect, the means for selecting the synchronization network element for the first network element may comprise: means for comparing the accumulated synchronization accuracy values for the at least two synchronization candidate network elements; and means for selecting the synchronization candidate network element that has the smallest accumulated synchronization accuracy value.

In a preferred embodiment of the second aspect, the quantified level of accumulated synchronization accuracy value for a selected synchronization network element may be signaled as a synchronization accuracy value by the first network element to at least one further network element for which the first network element can act as a synchronization candidate network element.

In a preferred embodiment of the second aspect, the signal quality indicator may relate to a signal-noise-ratio (SNR) of the received signal.

In a preferred embodiment of the second aspect, the first network element may comprise a first cell and the at least two synchronization candidate network elements may comprise each a candidate cell.

In a preferred embodiment of the second aspect, the apparatus may be used in radio-interface based (RIB) network synchronization.

In a preferred embodiment of the second aspect, the apparatus may be located in the first network element.

In a preferred embodiment of the second aspect, the first network element may be in an eNB.

According to a third aspect of the present disclosure, there is provided a computer program product including a program comprising software code portions being arranged, when run on a processor of an apparatus, to perform any method according to the first aspect.

According to a fourth aspect of the present disclosure, there is provided a system comprising two or more apparatuses according to the second aspect.

According the present disclosure, an apparatus comprising at least one processor and at least one memory storing at least one computer program code is provided, wherein in response to being executed on the processor, the at least one computer program code causes the processor to carry out the steps of the methods as mentioned above in the first aspect.

In view of the above, the present disclosure proposes a solution of enhancing the performance of RIB network synchronization by indicating an estimate of an accumulated synchronization error magnitude. The indication is beneficial for RIB source network element or source cell selection and it could help to make the topology of synchronized network elements/cells more reasonable. That is, if the environment is quite good, synchronization chains of network elements/cells can extend to the maximum number of hops supported. If the environment is challenging, the allowed synchronization chain length will be shorter. So the invention supports that the maximum number of network element/cell hops in a synchronization chain will be flexible and aligned with the actual environment. Here, two example ways of synchronization accuracy indication are proposed, explicitly indicating the accumulated synchronization error or implicitly through stratum-level indication.

It should be noted that above described procedures may apply to network elements and/or to cells, where the cells can be radio cells which may be part of a network element, for example a base station or an eNB. A network element may comprise of several cells. Further the above described procedures are not limited to radio networks or any specific (radio) network technology, they could be applied to any kind of networks where synchronization is needed, for example also to fixed networks.

Further it should be noted that the term "signal quality indicator" in the above procedures can be any kind of quality indicator, for example related to a signal received from a synchronization candidate network element, like for example a signal quality indicator measured (e.g. SNR, receive level, etc . . . ) from the signal received from the synchronization candidate network element or a reported signal quality indicator of the synchronization candidate network element.

BRIEF DESCRIPTION OF THE DRAWINGS

In the following, the present invention will be described in greater detail by way of non-limiting examples with reference to the accompanying drawings, in which.

DETAIL DESCRIPTION OF EMBODIMENTS OF THE DISCLOSURE

Figure 1:
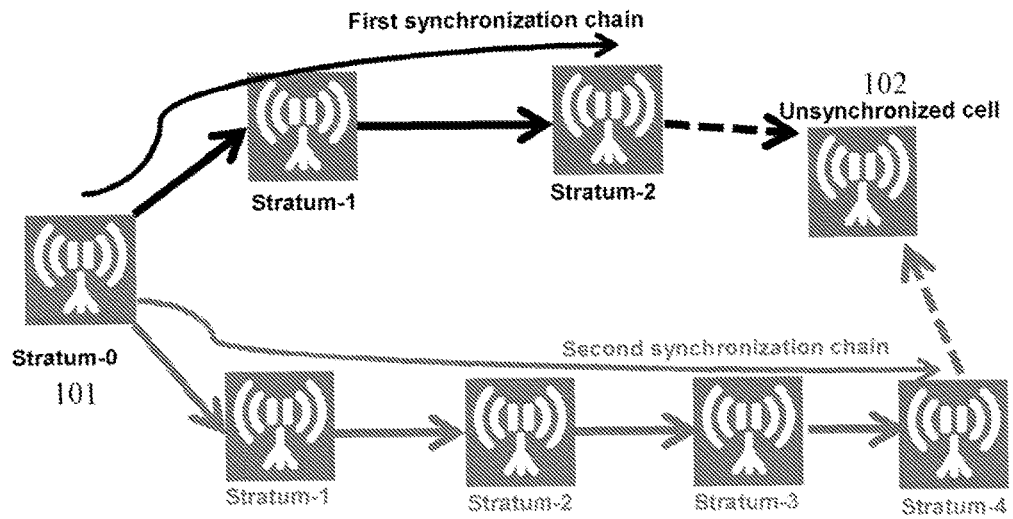
FIG. 1 shows an example schematic diagram of RIB synchronization chain.

The present disclosure is described herein with reference to particular non-limiting examples and to the contents that are presently considered to be embodiments of the present disclosure. A person skilled in the art will appreciate that the present disclosure is by no means limited to these examples, and may be more broadly applied.

Some terms are used for denoting specific system components throughout the application document. As would be appreciated by those skilled in the art, different designations are usually used for denoting the same component, thus the application document does not intend to distinguish those components that are only different in name rather than in function. In the application document, terms "comprise", "include" and "have" are used in an opening way, and thus they shall be construed as meaning "comprise but not limited to . . . ". Besides, the term "coupled", as may be used herein, includes direct coupling and indirect coupling via another component. Inferred coupling, for example where one element is coupled to another element by inference, includes direct and indirect coupling between two elements in the same manner as "coupled".

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

Some FIGURES may use similar reference numbers. This is merely to indicate that the same number in different FIGURES may be similar types of items. However, the same number in different FIGURES may be each its own iteration or aspect of this disclosure.

To tackle the issues as identified in the background section (e.g. the problems related to the legacy SNR threshold selection), an indication of an estimated accumulated synchronization error magnitude may be introduced in RIB synchronization, where this indication may be beneficial for RIB synchronization source cell selection and makes the topology of synchronized cells more reasonable. A cell can also more reliably determine whether the RIB synchronization was successful or not. For example, if the (radio) environment is quite good and cells can receive signals from synchronization source cells at good quality, synchronization chains can extend to the maximum number of hops supported. Otherwise, if the (radio) environment is challenging and cells can receive signals from synchronization source cells only at low quality, the allowed synchronization chain length will be shorter. Thus the maximum number of hops in a synchronization chain will be flexible and aligned with the actual (radio) environment.

Supporting such synchronization accuracy indication may be achieved either by explicitly indicating the estimated accumulated synchronization error or implicitly indicating it through for example stratum-level indication.

As described above, synchronization accuracy indication could be achieved either by explicitly indicating the estimated accumulated synchronization error magnitude or implicitly indicating it through stratum-level indication. The first type of indication, i.e., explicit synchronization accuracy indication, will be discussed below in detail with reference to FIG. 2.

Figure 2:
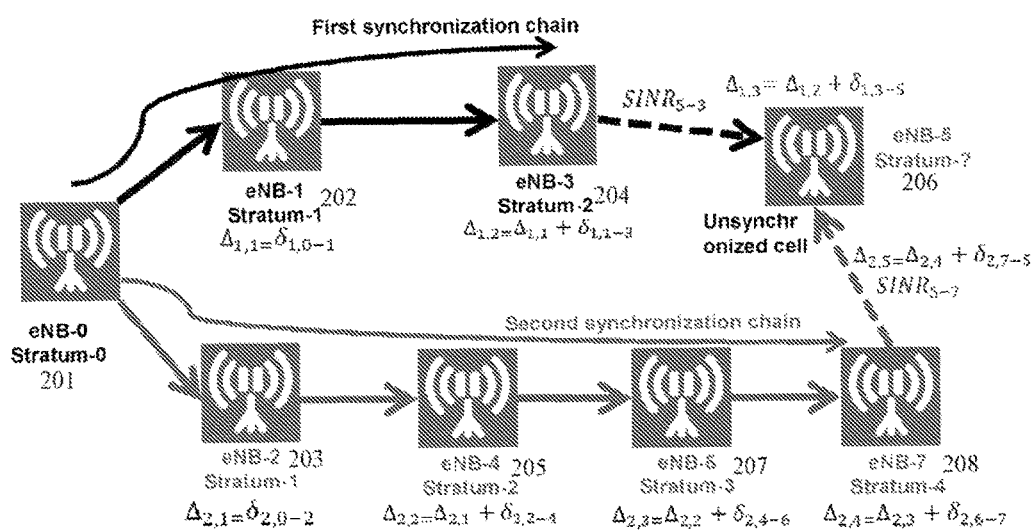
FIG. 2 shows an example schematic diagram of explicit synchronization accuracy indication according to an exemplary embodiment of the present disclosure.

As shown in FIG. 2, which shows a schematic diagram of explicit synchronization accuracy indication according to an exemplary embodiment of the present disclosure, the (accumulated) synchronization accuracy indicator $\Delta_{i,p}$ can be introduced, where $\Delta_{i,p}$ denotes the estimated synchronization error magnitude or accuracy indication between stratum-p cell and stratum-0 cell for synchronization chain i. In the following description the term "synchronization accuracy (indication)" may be replaced by "synchronization error (indication)" since both terms could be used for the same purpose.

In each hop or stratum, the value of accumulated synchronization accuracy indication or synchronization error magnitude $\Delta_{i,p}$ can be updated with the synchronization error $\delta_{i,m-n}$, where $\delta_{i,m-n}$ denotes the rough magnitude estimate of synchronization error between cell-m and cell-n for synchronization chain-i. Practically, the value of $\delta_{i,m-n}$ could be estimated by a kind of build-in mapping table (for the cell eNBs from different vendors, there might be different build-in mapping tables). Depending on for example the measured SNR for the synchronization signal from the source eNB, the synchronization-offset/error magnitude could be estimated with a certain probability assumed. The estimated offset is not a precise value and may be regarded rather as an indicated synchronization accuracy range. Therefore it could not be used for direct synchronization error compensation.

As shown in FIG. 2, for example, the synchronization error $\delta_{1,0-1}$ may indicate the estimate of synchronization error magnitude between eNB-0 201 and eNB-1 202 for the first hop in the first synchronization chain; the synchronization error $\delta_{1,1-3}$ may indicate the estimate of synchronization error magnitude between eNB-1 202 and eNB-3 204 for the first synchronization chain; and so on. Therefore, the value of accumulated synchronization accuracy indication or synchronization error magnitude $\Delta_{i,p}$ can be calculated based on a sum of all of the synchronization errors preceding the stratum-p for synchronization chain i. For example, $\Delta_{1,2}=\Delta_{1,1}+\delta_{1,1-3}$, and $\Delta_{1,3}=\Delta_{1,2}+\delta_{1,3-5}=\Delta_{1,1}+\delta_{1,1-3}+\delta_{1,3-5}=\delta_{1,0-1}+\delta_{1,1-3}+\delta_{1,3-5}$, and so on. Likewise, the case in the second synchronization chain is similar to that in the first synchronization chain. In FIG. 2, two synchronization chains have been illustrated only by way of example, and there may be more than two synchronization chains in the network.

The implementation may become complex if the absolute value of accumulated synchronization error magnitude is indicated. The absolute value of accumulated synchronization error magnitude could be quantified into several synchronization accuracy levels, and these levels could be denoted by for example a limited number of binary bits. In addition, a quantified synchronization accuracy indication table may be defined, and the number of levels for accumulated synchronization accuracy indication may be based on a trade-off between overhead and performance. An example of 4-bit synchronization accuracy indication table with e.g., 16 synchronization accuracy levels is shown in Table-1. By utilizing such bit signaling, the quantified level of accumulated synchronization accuracy in each synchronization link is passed through from the source cell to the listening cell, and the listening cell could use this information for better source cell selection and at the same time could be sure that it also meets the synchronization accuracy requirement. A cell can also more reliably determine whether the RIB synchronization was successful or not, i.e., whether it can acquire RIB synchronization with sufficient accuracy or not.

TABLE 1

Example of 4-bit Synchronization Accuracy Indication Table

| Synchronization Accuracy Level | 4-bit Indication | Accumulated Synchronization Accuracy Range in μs |
|---|---|---|
| 0 | 0000 | 0.00-0.05 |
| 1 | 0001 | 0.06-0.15 |
| 2 | 0010 | 0.16-0.25 |
| 3 | 0100 | 0.26-0.35 |
| 4 | 1000 | 0.36-0.45 |
| 5 | 0011 | 0.46-0.55 |
| 6 | 0101 | 0.56-0.65 |
| 7 | 1001 | 0.66-0.75 |
| 8 | 0110 | 0.76-0.85 |
| 9 | 1010 | 0.86-0.95 |
| 10 | 1100 | 0.96-1.05 |
| 11 | 0111 | 1.06-1.15 |
| 12 | 1110 | 1.16-1.25 |
| 13 | 1101 | 1.26-1.35 |
| 14 | 1011 | 1.36-1.45 |
| 15 | 1111 | 1.46-1.55 |

Turning back to the example of FIG. 2, both the first and second synchronization chains originate from the eNB0 201 at stratum-0 towards the eNB5 206. For eNB-5 source cell selection, stratum-2 at which the eNB-3 204 is located in the first synchronization chain, is lower than stratum-4 at which the eNB-7 208 is located in the second synchronization chain. Based on the legacy mechanism eNB-5 206 would select eNB with the lowest stratum level (eNB-3 204 with stratum-2) as its source cell and eNB-5 206 would mark its own stratum level to stratum-3, i.e., 2+1. However, it is possible that the accumulated synchronization accuracy $\Delta_{1,3}$ from the first synchronization chain is larger than the accumulated synchronization accuracy $\Delta_{2,5}$ from the second synchronization chain. In this explicit synchronization accuracy indication, by selecting the source cell based on the accumulated synchronization accuracy, e.g. taking the eNB-7 208 as the source cell for the eNB-5 206, the eNB-5 206 could eventually get better synchronization accuracy.

In addition, the synchronized cell could indicate the accumulated synchronization error magnitude to other cells that listen to the cell's listening RS. Such an indication of accumulated synchronization error magnitude may be indicated in explicit physical signaling or implicitly via selected listening RS transmission parameters, such as listening RS pattern.

The second type of indication, i.e., implicit synchronization accuracy indication, will be discussed below.

A stratum-level calculation for the listening cell may also include information on the signal quality indicator (e.g., SNR) condition with respect to its source cell. It can be used as an implicit way of synchronization accuracy indication. As an example, a process of source cell selection and stratum value calculation is proposed below, and the issue of accumulated synchronization error magnitude is automatically considered. Therefore, for a RIB listening cell, at least part of the following steps may be performed:

Determine signal quality indicator (e.g., SNR) threshold levels, as shown in Table-2. The threshold levels can for example correspond to certain synchronization error magnitudes for example based on SNR. In the first row of Table-2, the SNR threshold level may be defined as SNR_T1; in the second row, SNR_T2; and so on. The signal quality indicator threshold levels can be predetermined e.g. in specifications or configured to the eNB by another network element, e.g., an element supporting network operation and maintenance functionalities.

Measure SNR (SNR is taken as a non-limiting example of the signal quality indicator herein below) of a link between the listening cell and a candidate source cell and determine the corresponding SNR threshold level. For example, the largest SNR threshold level smaller than the measured SNR is selected. For example the SNR_TX is determined, wherein X indicates an index of SNR threshold level (in the example of Table-2, X is 1, 2, . . . , 6).

Get a stratum value of a candidate source cell.

Determine a stratum value for the current listening cell. The determination depends on both the candidate source cell stratum value and the determined SNR threshold level index. For example the determined stratum value is equal to:

candidate source cell stratum value+SNR threshold level index X (also other ways how to calculate the stratum value for the current listening cell are possible, for example by dividing/multiplying the factor X or where getting X via a mapping table or some defined equation).

Select the candidate source cell that results in the lowest stratum value for the current listening cell as the synchronization source cell.

Adopt the determined stratum value as the stratum value for the current listening cell.

If the adopted stratum value is equal to or lower than the maximum supported stratum value, the cell is determined to be synchronized. The cell starts to transmit its own listening RS. The transmission of listening RS may depend on cell configuration and e.g. if the cell stratum value is lower or equal than the maximum supported stratum value. The cell indicates its stratum value to other cells that listen to the cell's listening RS. The indication of stratum value can occur e.g. by explicit signaling or implicitly via selected listening RS transmission parameters, such as listening RS pattern.

A cell may be determined to be un-synchronous if the lowest stratum value determined for potential source cells is larger than a maximum allowed stratum value.

As can be seen, the utilized threshold levels (e.g., the left SNR threshold level column of Table-2 below) could be specified based on some pre-defined thresholds (e.g., the right SNR threshold column of Table-2 below). The number of threshold levels to be defined is a trade-off between overhead and performance. Table-2 shows an example where 6 SNR threshold levels are specified with the corresponding index X ranging from 1 to 6. In this example, a higher SNR threshold index corresponds to a lower defined SNR threshold level, and a lower SNR threshold index corresponds to a higher defined SNR threshold level. Thus, with a larger SNR threshold index selected from Table-2, it indicates a worse channel link between the listening cell and its source cell with low SNR. Further, by adding the corresponding index to the stratum value of the source cell, the resulting stratum-level of the listening cell is higher as well, which also implicitly indicates that the number of supported hops in this synchronization chain is quite limited as well.

TABLE 2

Example of Defined SNR Threshold and SNR Threshold Level

| SNR Threshold Level | SNR Threshold |
|---|---|
| SNR_T1 | 10 dB |
| SNR_T2 | 5 dB |
| SNR_T3 | 0 dB |
| SNR_T4 | −5 dB |
| SNR_T5 | −10 dB |
| SNR_T6 | −15 dB |

Figure 3:
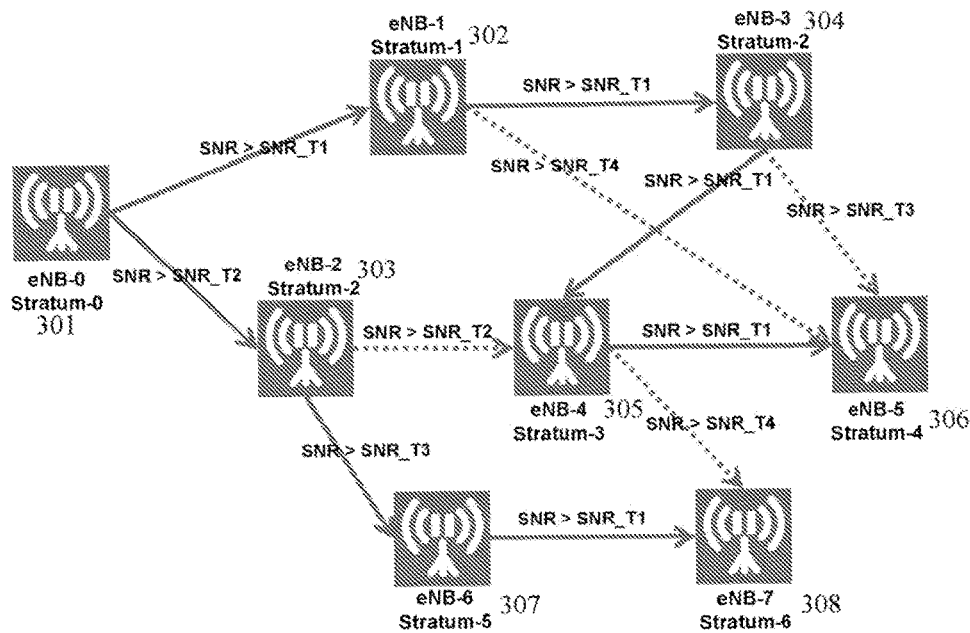
FIG. 3 shows an example schematic diagram of implicit synchronization accuracy indication according to an exemplary embodiment of the present disclosure.

To further illustrate the idea, an example is shown in FIG. 3. Assuming that the measured SNR between eNB-6 307 and eNB-2 303 is about 2 dB, and according to the Table-2, the SNR threshold level of SNR_T3 will be selected. So for eNB-6 307, the resulting Stratum-5 is decided by the serial number of Stratum-2 (which is the stratum value of eNB-2 303)+SNR threshold level index-3. The eNB-6 307 of Stratum-5, with only 2-hop away from the Stratum-0 cell (i.e., eNB-0 301), indicates a very bad synchronization accuracy in this synchronization link, and it also indicates that the number of supported hops in this synchronization link is quite limited as well, compared with another synchronization link (in solid line such as 301→302→304→305→306 of FIG. 3).

In order to further evaluate the performance of the above proposed synchronization accuracy based scheme a system-level evaluation was conducted. As can be seen in Table-3 below, with overlaid Macro as Stratum-0, there are maximum 6-stratum in the simulation. With legacy based approach, the ratio for the un-synchronized RIB cell is about 15%. And to utilize the proposed synchronization accuracy based approach, the ratio for the un-synchronized RIB cell is reduced to only 2.25%, which has the performance improvement of roughly 13%.

TABLE 3

System-level Simulation Results of RIB

| | Stratum Level (Synchronized) | | | | | Un-synchronized |
|---|---|---|---|---|---|---|
| | 1 | 2 | 3 | 4 | 5 | |
| Legacy based Ratio (<3 us) Threshold = −10 dB | 25% | 40.5% | 14.88% | 4.38% | 0.24% | 15% |
| Proposed sync accuracy based Ratio | 25% | 52.75% | 15.88% | 3.75% | 0.38% | 2.25% |

Figure 4:
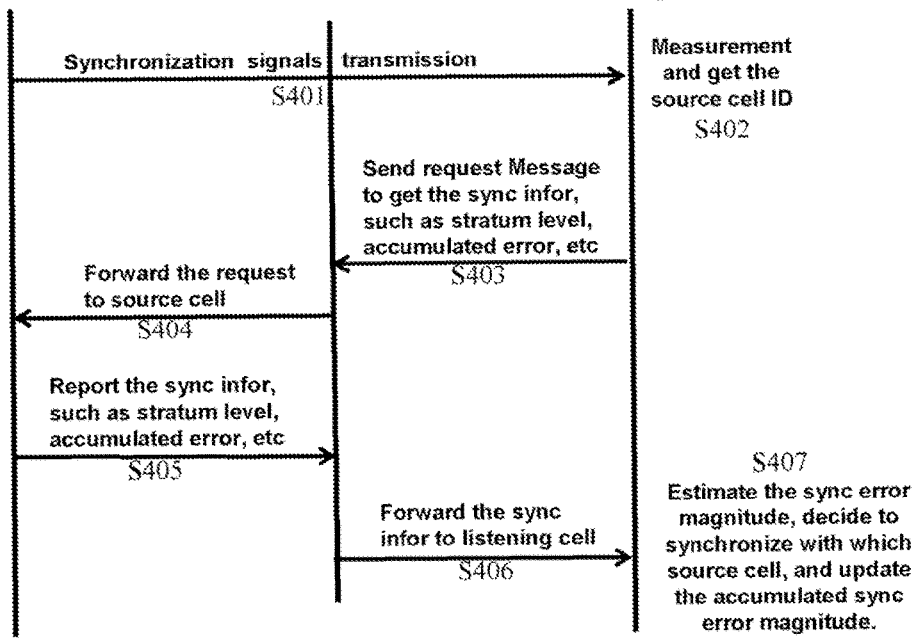
FIG. 4 shows an example signaling diagram for RIB network synchronization.

FIG. 4 shows an example of a timing/signaling diagram for RIB network synchronization. Also a direct communication for exchanging signaling messages between the source and the listening cell is possible (not shown).

As shown in FIG. 4, at step S401, a source cell 410 may transmit synchronization signals to a listening cell 430.

At step S402, the listening cell 430 may measure the quality, e.g., SNR, of the received synchronization signal from the source cell 410, and may get an ID of the source cell 410.

At step S403, the listening cell 430 may send, to a mobility management entity (MME) 420, a request message to get synchronization information, such as for example a stratum level of the source cell, an accumulated synchronization error magnitude, etc.

At step S404, the MME 420 may forward the request message to the source cell 410.

At step S405, the source cell 410 may report the synchronization information, such as for example the stratum level of the candidate source cell, the accumulated synchronization error magnitude, etc. to the MME 420.

At step S406, the MME 420 may further forward the synchronization information to the listening cell 430.

At step S407, the listening cell 430 may estimate the synchronization error magnitude, may decide to synchronize which cell and may update the accumulated synchronization error magnitude.

Figure 5:
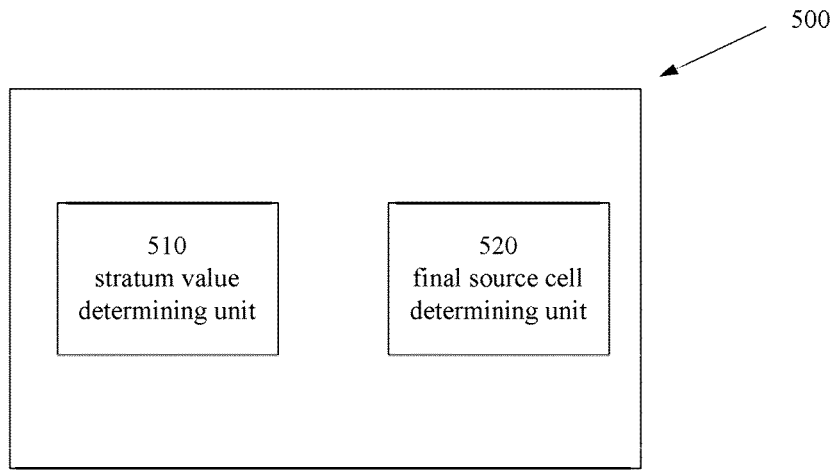
FIG. 5 shows a schematic block diagram of an example apparatus for performing source cell selection according to an exemplary embodiment of the present disclosure.

FIG. 5 shows a schematic block diagram of an apparatus for performing source cell selection according to an exemplary embodiment of the present disclosure.

The operations of the apparatus 500 shown in FIG. 5 may be performed through implicit synchronization accuracy indication as shown for example in FIG. 3. The apparatus 500 may be located in a listening cell within a system for network synchronization. The apparatus 500 may comprise a stratum value determining unit 510 and a final source cell determining unit 520.

The stratum value determining unit 510 may be configured to determine stratum values of the listening cell for different synchronization source cell candidates. As illustrated in FIG. 4, the listening cell to be synchronized may receive listening RS signals from several synchronization source cells and have a stratum value for each cell. The final source cell determining unit 520 may be configured to determine a final source cell for the listening cell based on the determined stratum values of the listening cell.

Figure 6:
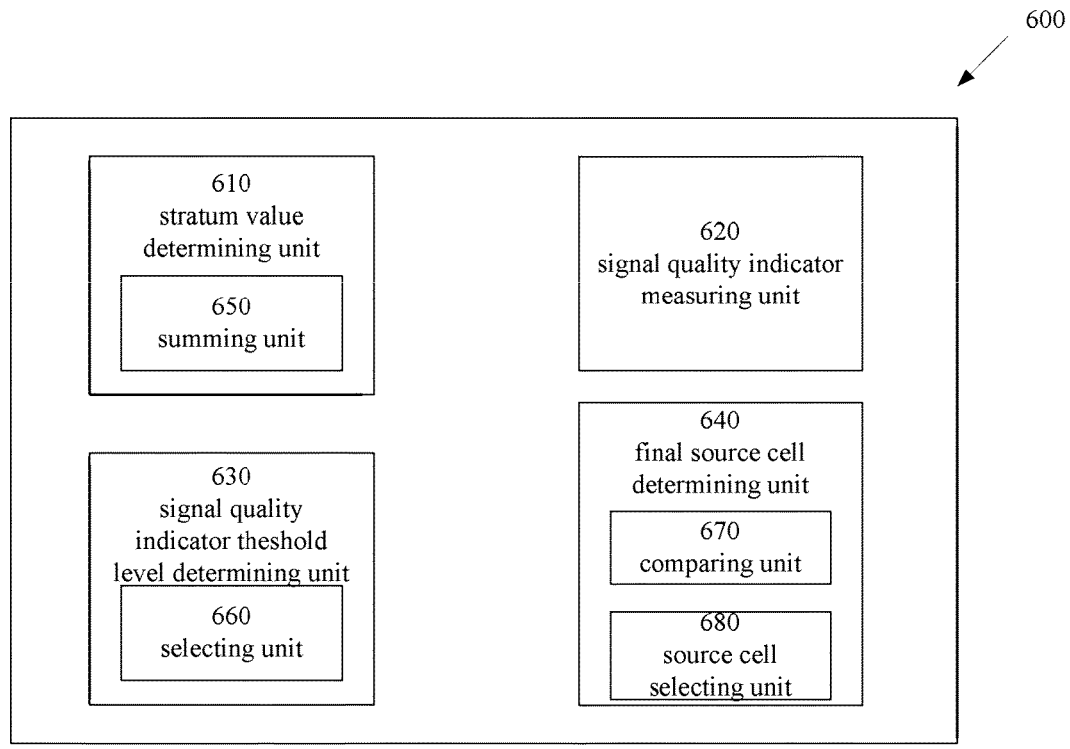
FIG. 6 shows a schematic block diagram of a specific example of the apparatus shown in FIG. 5 according to an exemplary embodiment of the present disclosure.

FIG. 6 shows a schematic block diagram of a specific example of the apparatus shown in FIG. 5 according to an exemplary embodiment of the present disclosure.

The apparatus 600 shown in FIG. 6 may comprise a stratum value determining unit 610, a signal quality indicator measuring unit 620, a signal quality indicator threshold level determining unit 630 and a final source cell determining unit 640. The stratum value determining unit 610 may further comprise a summing unit 650. The signal quality indicator threshold level determining unit 630 may further comprise a selecting unit 660. The final source cell determining unit 640 may further comprise a comparing unit 670 and a source cell selecting unit 680.

The stratum value determining unit 610 may be configured to determine stratum values of the listening cell for different synchronization source cell candidates based on stratum values of candidate source cells and signal quality indicator threshold level values existing between the listening cell and the candidate source cells.

The signal quality indicator measuring unit 620 may be configured to measure a signal quality indicator existing for the link between the listening cell and the candidate source cell. Preferably, the signal quality indicator is, but not limited to, SNR, as described above.

The signal quality indicator threshold level determining unit 630 may be configured to determine the signal quality indicator threshold level value existing between the listening cell and the candidate source cell based on the measured signal quality indicator. Specifically, the selecting unit 660 may be configured to select, among a plurality of predefined signal quality indicator threshold level values (e.g., as shown in Table-2), the largest signal quality indicator threshold level value that is smaller than the measured signal quality indicator to be the signal quality indicator threshold level value.

The summing unit 650 in the unit 610 may be configured to sum the stratum value of a candidate source cell with the signal quality indicator threshold level value, e.g., as selected by the selecting unit 660, existing between the listening cell and the candidate source cell so as to obtain the stratum value of the listening cell corresponding for the candidate source cell.

Similar to the final source cell determining unit 520 shown in FIG. 5, the final source cell determining unit 640 may be configured to determine a final source cell for the listening cell based on the determined stratum values of the listening cell. Specifically, in the final source cell determining unit 640, the comparing unit 670 may be configured to compare the stratum values of the listening cell for different candidate source cells, e.g., as determined by the stratum value determining unit 610, and the source cell selecting unit 680 may be configured to select the candidate source cell that results in the lowest stratum value of the listening cell as the final source cell.

Figure 7:
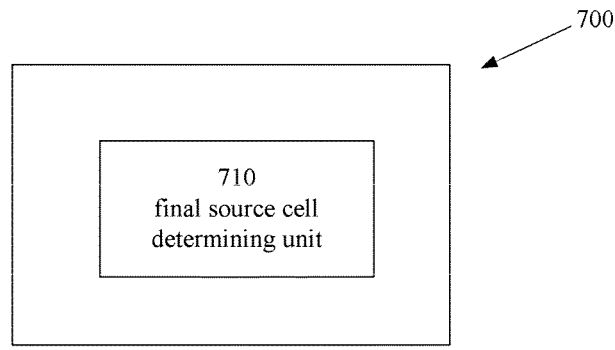
FIG. 7 shows a schematic block diagram of an example apparatus for performing source cell selection according to another exemplary embodiment of the present disclosure.

FIG. 7 shows a schematic block diagram of an apparatus for performing source cell selection according to an exemplary embodiment of the present disclosure.

The operation of the apparatus 700 shown in FIG. 7 may be performed through explicit synchronization accuracy indication as shown for example in FIG. 2. The apparatus 700 may be located in a listening cell within a system for network synchronization. The apparatus 700 may comprise a final source cell determining unit 710.

The final source cell determining unit 710 may be configured to determine a final source cell for a listening cell based on an accumulated synchronization accuracy values for different synchronization source cell candidates. Unlike the apparatus 500, the source cell here may be determined based on the accumulated synchronization accuracy indicators, i.e., $\Delta_{i,p}$ shown in FIG. 2.

Figure 8:
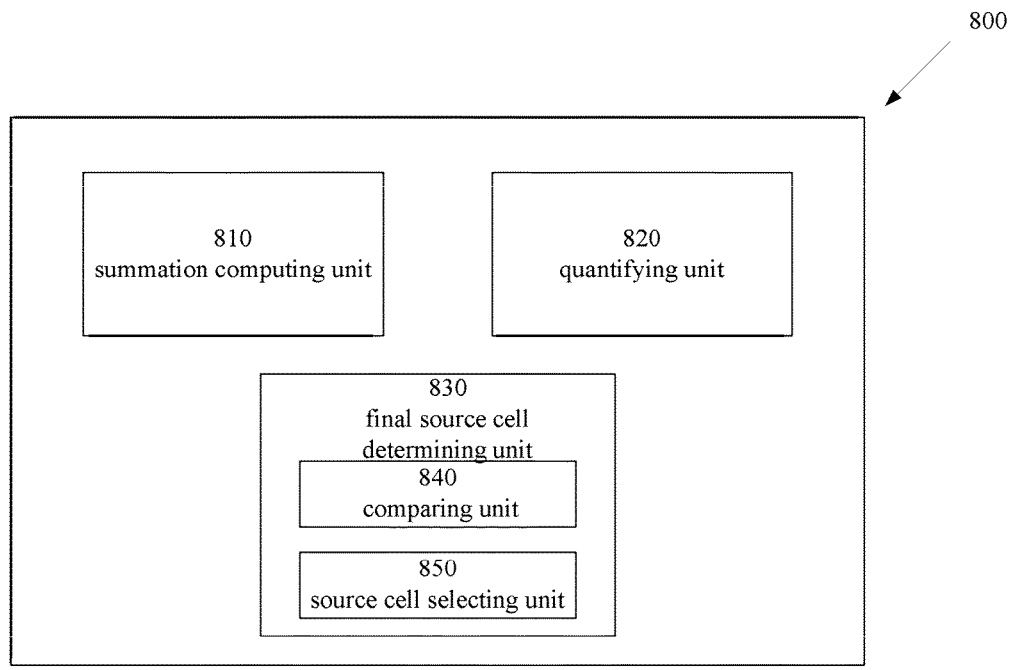
FIG. 8 shows a schematic block diagram of a specific example of the apparatus shown in FIG. 7 according to another exemplary embodiment of the present disclosure.

FIG. 8 shows a schematic block diagram of a specific example of the apparatus shown in FIG. 7 according to an exemplary embodiment of the present disclosure.

The apparatus 800 shown in FIGURES may comprise a summation computing unit 810, a quantifying unit 820 and a final source cell determining unit 830. The final source cell determining unit 830 further may comprise a comparing unit 840 and a source cell selecting unit 850.

The summation computing unit 810 may be configured to compute the accumulated synchronization accuracy value by summing all of individual synchronization error values, i.e., $\delta_{i,m-n}$ shown in FIG. 2. Preferably, these synchronization error values may be estimated by using build-in mapping tables. The build-in mapping tables may be different for cells from different vendors or for cells from different network elements and/or different cell types (for example different tables for macro and pico cells).

The quantifying unit 820 may be configured to quantify the absolute value of the accumulated synchronization accuracy value into a plurality of levels. Preferably, the plurality of levels are denoted by limited bits, such as binary bits as shown in Table-1. Preferably, the number of the quantified levels may be based on trade-off between performance and overhead of the network. The quantified level of accumulated synchronization accuracy in each synchronization link may be passed through from the source cell to the listening cell. A better source cell selection can be made through the signaling of the quantified levels.

Similar to the final source cell determining unit 710 shown in FIG. 7, the final source cell determining unit 830 may be configured to determine a final source cell for a listening cell based on an accumulated synchronization accuracy values. Specifically, in the final source cell determining unit 830, the comparing unit 840 may be configured to compare the accumulated synchronization accuracy values for different synchronization candidate source cells, e.g., as determined by summation computing unit 810, and the source cell selecting unit 850 may be configured to select the source cell that has the smallest accumulated synchronization accuracy value. The comparing unit 840 may be configured to compare the stratum value of the listening cell for the final source cell with the maximum supported stratum value, and to determine the listening cell to be synchronized with the final source cell if the stratum value of the listening cell for the final source cell is equal to or lower than the maximum supported stratum value.

Figure 9:
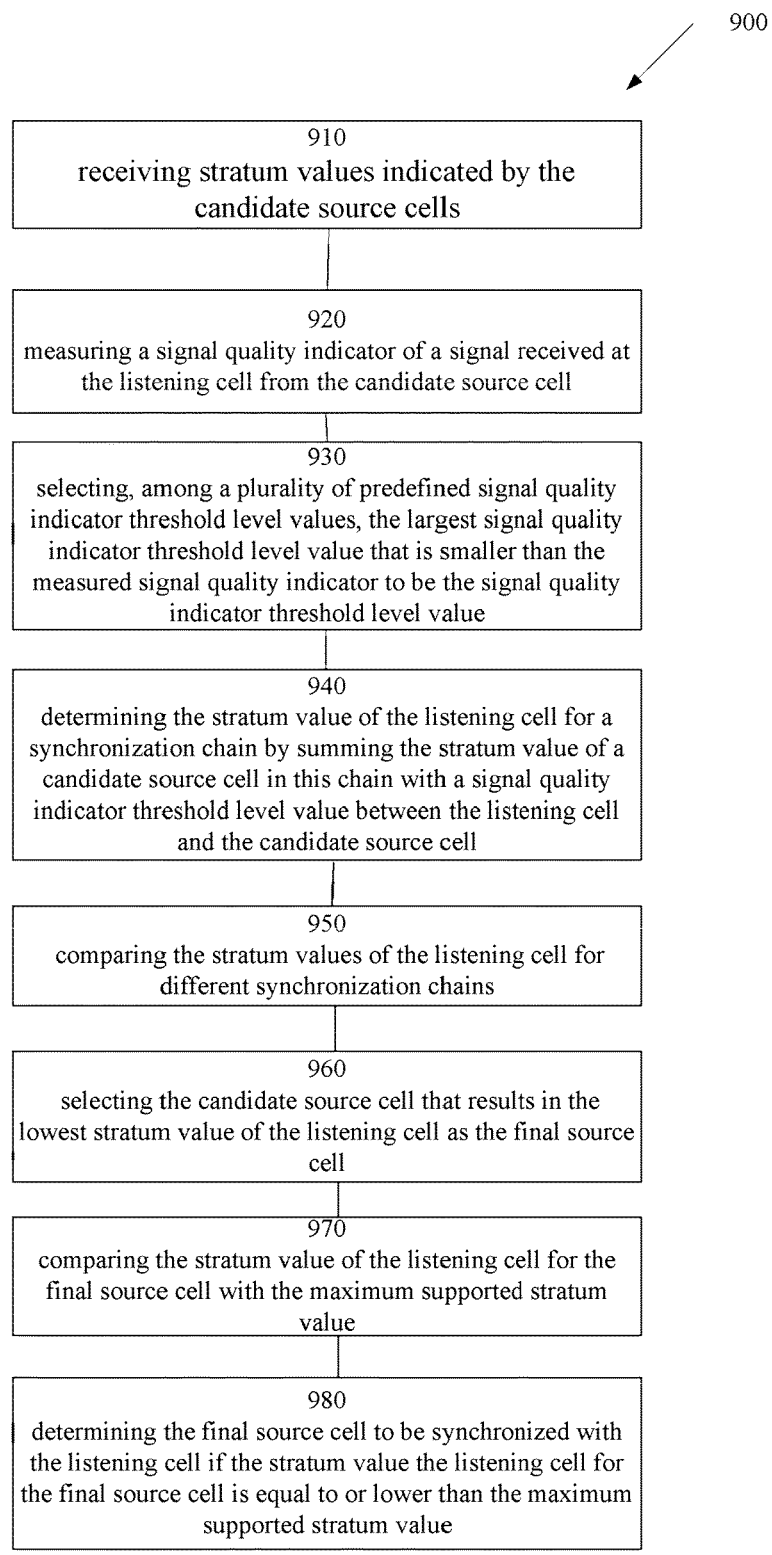
FIG. 9 shows an example flow chart of a method for performing source cell selection according to an exemplary embodiment of the present disclosure.

FIG. 9 shows an example flow chart of a method for performing source cell selection according to another exemplary embodiment of the present disclosure.

The steps of the method 900 shown in FIG. 9 may be performed through implicit synchronization accuracy indication as described above. The method 900 may be performed in a listening cell.

As shown in FIG. 9, at block 910, stratum values of candidate source cells indicated by the candidate source cells may be received.

At block 920, a signal quality indicator of a signal received at the listening cell from the candidate source cell may be measured.

At block 930, the largest signal quality indicator threshold level value that is smaller than the measured signal quality indicator may be selected, among a plurality of predefined signal quality indicator threshold level values, to be the signal quality indicator threshold level value.

At block 940, the stratum value of the listening cell for the synchronization candidate source cell may be determined by summing the stratum value of the candidate source cell with the signal quality indicator threshold level value between the listening cell and the candidate source cell.

At block 950, the stratum values of the listening cell for different source cells may be compared with each other.

At block 960, the candidate source cell that results in the lowest stratum value of the listening cell may be selected as the final source cell.

At block 970, the stratum value of the listening cell for the final source cell may be compared with the maximum supported stratum value.

At block 980, the final source cell may be determined to be synchronized with the listening cell if the stratum value the listening cell for the final source cell is equal to or lower than the maximum supported stratum value. If not, no source cell would be synchronized with the listening cell.

Figure 10:
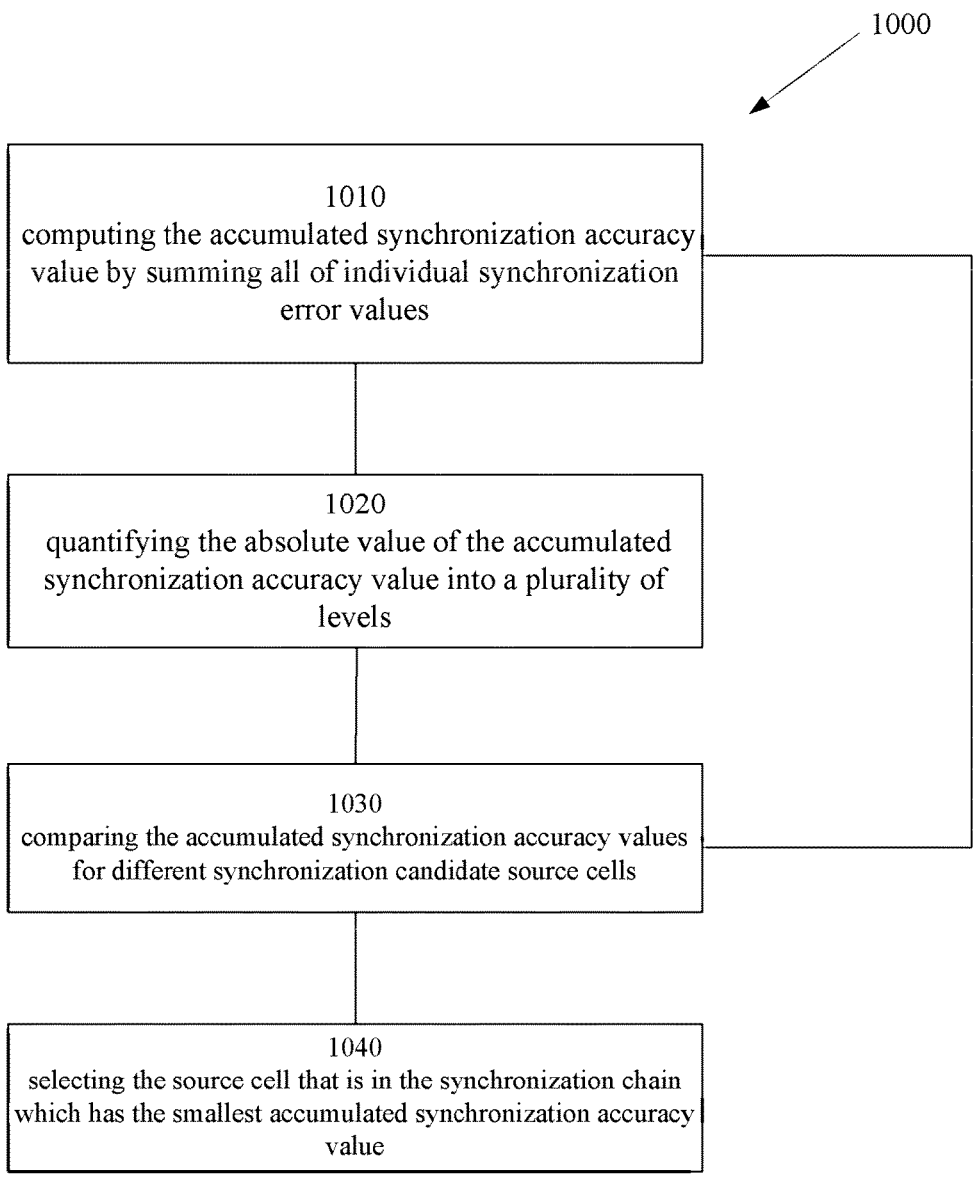
FIG. 10 shows an example flow chart of a method for performing source cell selection according to another exemplary embodiment of the present disclosure.

FIG. 10 shows an example flow chart of a method for performing source cell selection according to another exemplary embodiment of the present disclosure.

The steps of the method 1000 shown in FIG. 10 may be performed through explicit synchronization accuracy indication as shown in FIG. 2. The method 1000 may be performed in a listening cell.

As shown in FIG. 10, at block 1010, the accumulated synchronization accuracy value may be computed by summing all of individual synchronization error values.

At block 1020, the absolute value of the accumulated synchronization accuracy value may be quantified into a plurality of levels. The block 1020 may be skipped by the explicit synchronization accuracy indication process.

At block 1030, the accumulated synchronization accuracy values for different synchronization candidate source cells may be compared with other.

At block 1040, the source cell that has the smallest accumulated synchronization accuracy value may be selected.

Figure 11:
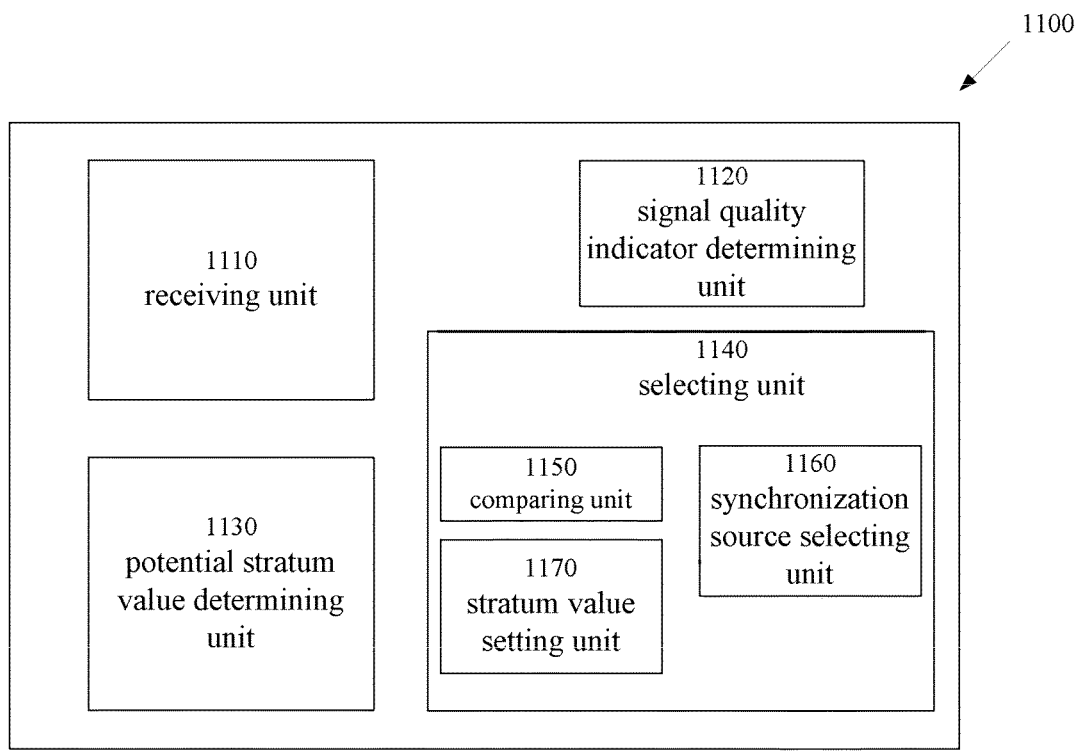
FIG. 11 shows a schematic block diagram of a specific example apparatus according to an exemplary embodiment of the present disclosure.

FIG. 11 shows a schematic block diagram of a specific example apparatus according to an exemplary embodiment of the present disclosure.

The apparatus 1100 shown in FIG. 11 may be located in a listening cell within a system for network synchronization. The apparatus 1100 may comprise a receiving unit 1110, a signal quality indicator determining unit 1120, a potential stratum value determining unit 1130 and a selecting unit 1140. The selecting unit 1140 may further comprise a comparing unit 1150, a synchronization source selecting unit 1160, and a stratum value setting unit 1170.

The receiving unit 1110 may be configured to receive from each of at least two synchronization candidate network elements (e.g., candidate source cells), a stratum value of a synchronization candidate network element. The signal quality indicator determining unit 1120 may be configured to determine, for each of the at least two synchronization candidate network elements, a signal quality indicator (e.g., SNR of the received signal).

The potential stratum value determining unit 1130 may be configured to determine the potential stratum value of the first network element (e.g., the listening cell) for a synchronization candidate network element.

In a preferred embodiment, the determination of potential stratum value of the first network element for a synchronization candidate network element may be performed by: incrementing the stratum value of the synchronization candidate network element by one if the signal quality indicator is above a predetermined threshold; and incrementing the stratum value of the synchronization candidate network element by more than one if the signal quality indicator is below the threshold.

In a preferred embodiment, the determination of potential stratum value of the first network element for a synchronization candidate network element may be performed by incrementing the stratum value of the synchronization candidate network element by a value that depends inversely on a quantized value of the signal quality indicator value.

The selecting unit 1140 may be configured to select a synchronizing network element, for synchronizing the first network element to, from the at least two synchronization candidate network elements, based on the determined potential stratum value of the first network element.

Specifically, in the selecting unit 1140, the comparing unit 1150 may be configured to compare the potential stratum values of the first network element for different synchronization candidate network elements determined by the potential stratum value determining unit 1130. The synchronization source selecting unit 1160 may be configured to select the synchronization candidate network element with the lowest determined potential stratum value as a synchronization source for first network element. The stratum value setting unit 1170 may be configured to set the stratum value of the first network element to the determined potential stratum value of the first network element for the synchronization candidate network element selected by the synchronization source selecting unit 1160 as the synchronization source for first network element.

Figure 12:
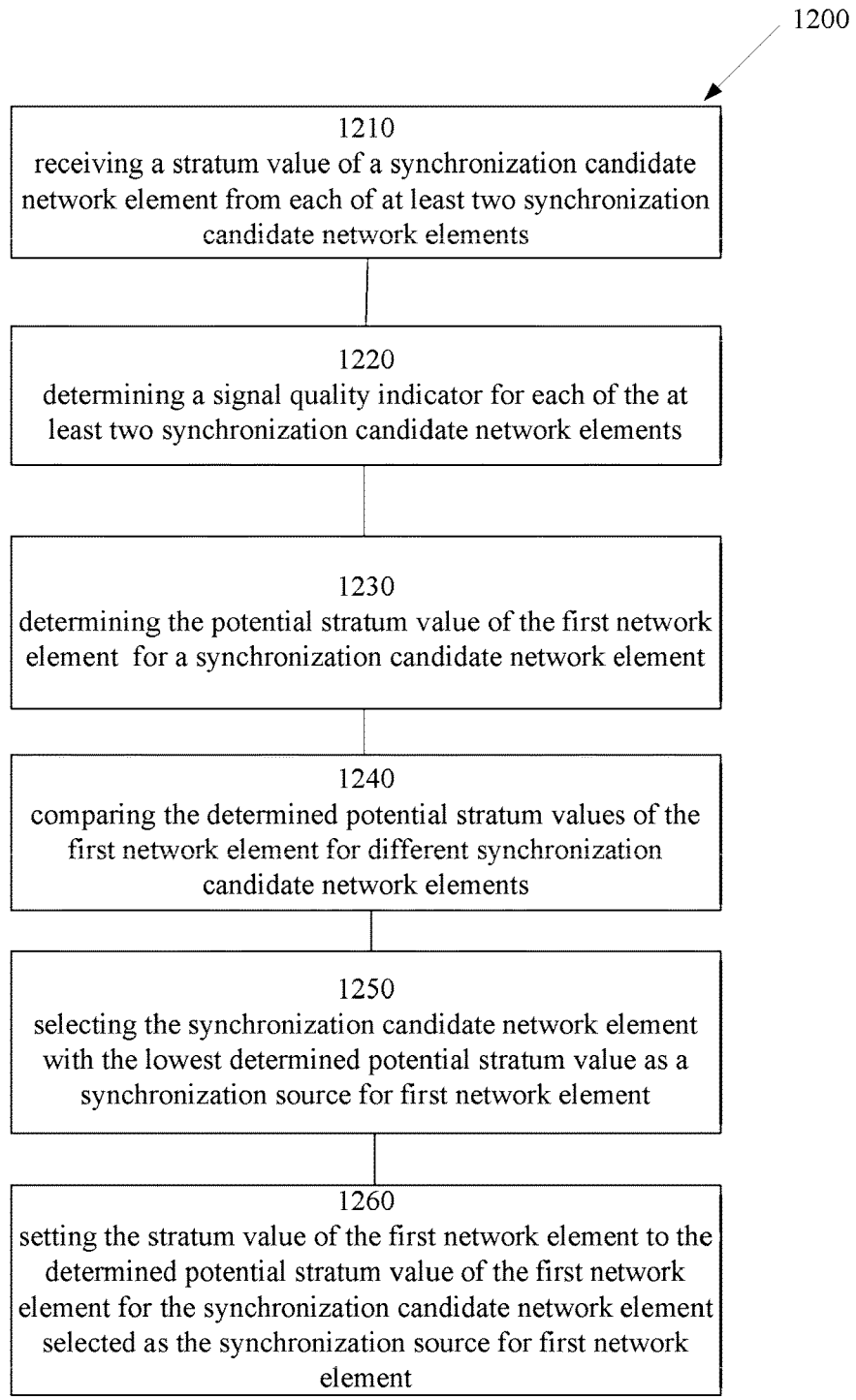
FIG. 12 shows an example flow chart of an example method according to an exemplary embodiment of the present disclosure.

FIG. 12 shows an example flow chart of an example method according to an exemplary embodiment of the present disclosure. The method 1200 shown in FIG. 12 may be performed in a listening cell.

As shown in FIG. 12, at block 1210, a stratum value of a synchronization candidate network element may be received from each of at least two synchronization candidate network elements (e.g., candidate source cells).

At block 1220, a signal quality indicator (e.g., SNR of the received signal) may be determined for each of the at least two synchronization candidate network elements.

At block 1230, the potential stratum value of the first network element (e.g., the listening cell) for a synchronization candidate network element may be determined. In a preferred embodiment, it may be determined by: incrementing the stratum value of the synchronization candidate network element by one if the signal quality indicator is above a predetermined threshold; and incrementing the stratum value of the synchronization candidate network element by more than one if the signal quality indicator is below the threshold. In a preferred embodiment, it may be determined by incrementing the stratum value of the synchronization candidate network element by a value that depends inversely on a quantized value of the signal quality indicator value.

At block 1240, the determined potential stratum values of the first network element for different synchronization candidate network elements may be compared.

At block 1250, the synchronization candidate network element with the lowest determined potential stratum value may be selected as a synchronization source for first network element.

At block 1260, the stratum value of the first network element may be set to the determined potential stratum value of the first network element for the synchronization candidate network element selected as the synchronization source for first network element.

Figure 13:
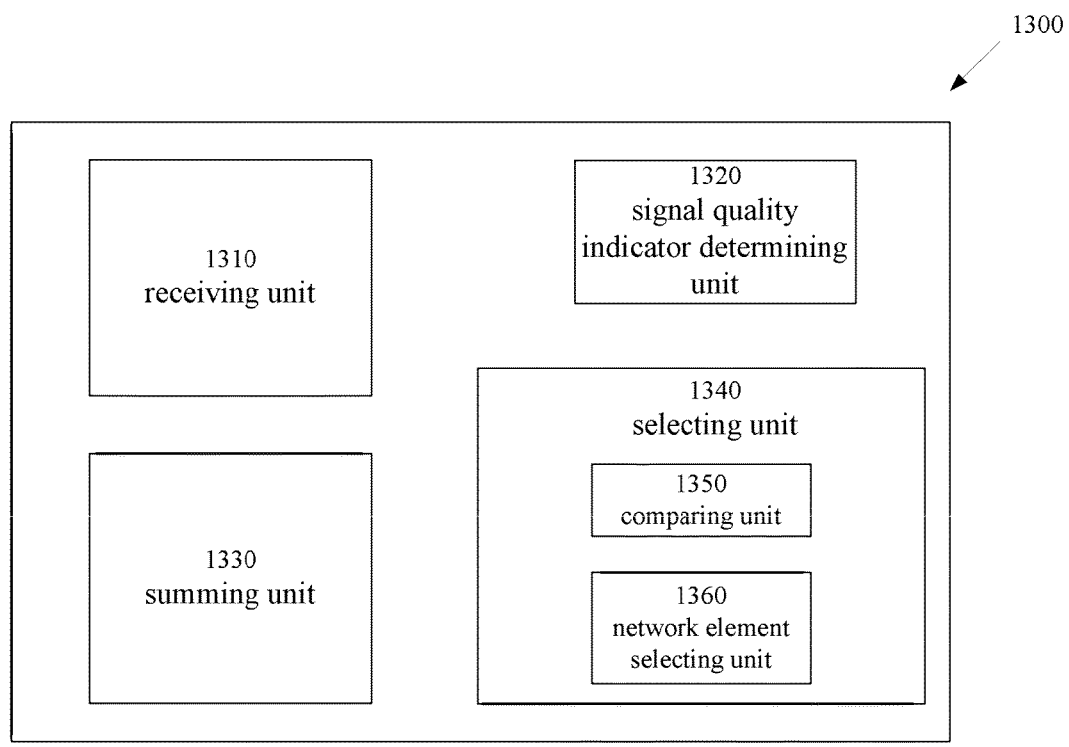
FIG. 13 shows a schematic block diagram of a specific example apparatus according to an exemplary embodiment of the present disclosure.

FIG. 13 shows a schematic block diagram of a specific example apparatus according to an exemplary embodiment of the present disclosure.

The apparatus 1300 shown in FIG. 13 may be located in a listening cell within a system for network synchronization. The apparatus 1300 may comprise a receiving unit 1310, a signal quality indicator determining unit 1320, a summing unit 1330 and a selecting unit 1340. The selecting unit 1340 may further comprise a comparing unit 1350 and a network element selecting unit 1360.

The receiving unit 1310 may be configured to receive from each of at least two synchronization candidate network elements (e.g., candidate source cells), a stratum value of a synchronization candidate network element. The signal quality indicator determining unit 1320 may be configured to determine, for each of the at least two synchronization candidate network elements, a signal quality indicator (e.g., SNR of the received signal).

The summing unit 1330 may be configured to, for each synchronization candidate network element, sum the received synchronization accuracy value of the synchronization candidate network element with an individual synchronization error magnitude value estimated from the determined signal quality indicator for the synchronization candidate network element, so as to determine the accumulated synchronization accuracy value for the synchronization candidate network element.

In the selecting unit 1340, the comparing unit 1350 may be configured to compare the accumulated synchronization accuracy values for the at least two synchronization candidate network elements, and the network element selecting unit 1360 may be configured to select the synchronization candidate network element that has the smallest accumulated synchronization accuracy value.

Figure 14:
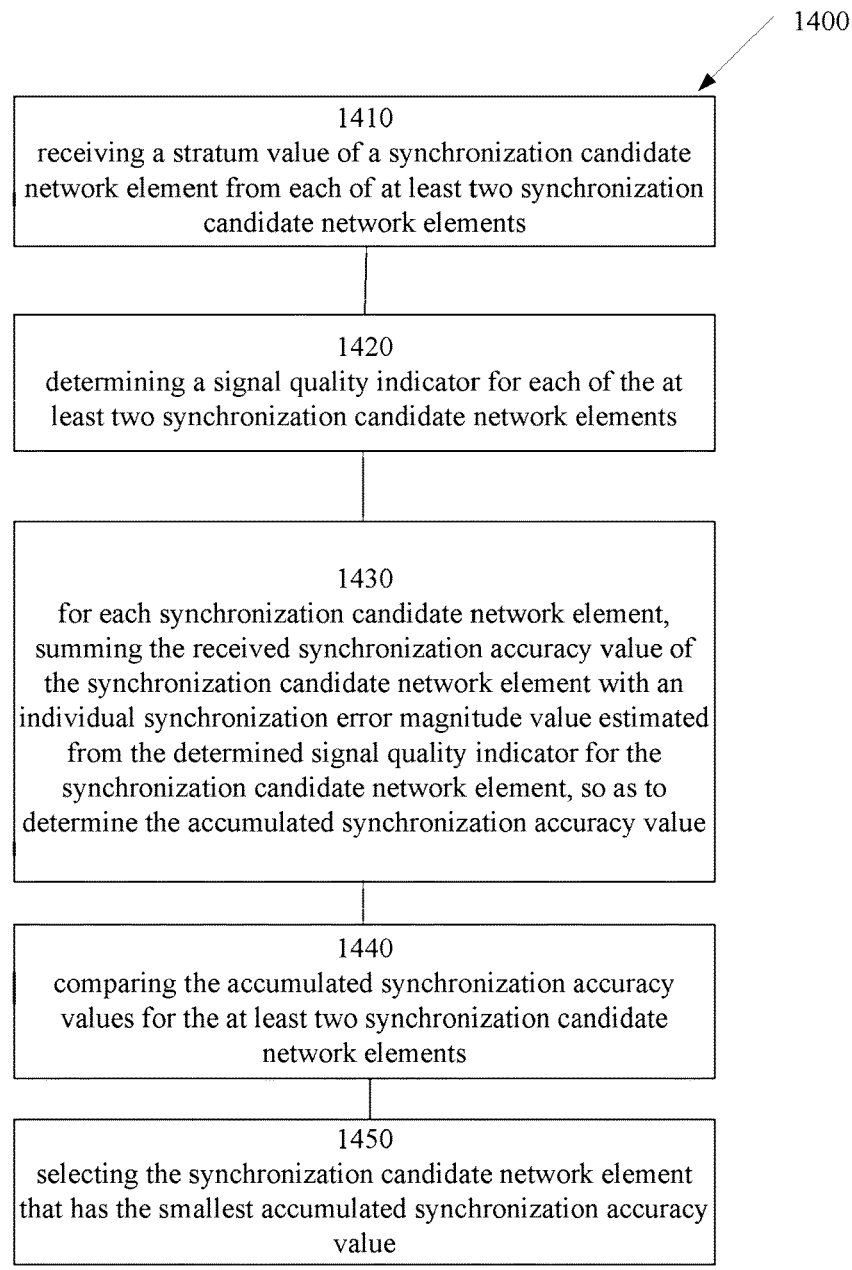
FIG. 14 shows an example flow chart of an example method according to an exemplary embodiment of the present disclosure.

FIG. 14 shows an example flow chart of an example method according to an exemplary embodiment of the present disclosure. The method 1400 shown in FIG. 14 may be performed in a listening cell.

As shown in FIG. 14, at block 1410, a stratum value of a synchronization candidate network element may be received from each of at least two synchronization candidate network elements (e.g., candidate source cells).

At block 1420, a signal quality indicator (e.g., SNR of the received signal) may be determined for each of the at least two synchronization candidate network elements.

At block 1430, for each synchronization candidate network element, the received synchronization accuracy value of the synchronization candidate network element may be summed with an individual synchronization error magnitude value estimated from the determined signal quality indicator for the synchronization candidate network element, so as to determine the accumulated synchronization accuracy value for the synchronization candidate network element. Preferably, the individual synchronization error magnitude value is estimated by using a mapping table, and more preferably, different mapping tables may be different for cells from different vendors or for cells from different network elements and/or different cell types (for example different tables for macro and pico cells).

At block 1440, the accumulated synchronization accuracy values for the at least two synchronization candidate network elements may be compared.

At block 1450, the synchronization candidate network element that has the smallest accumulated synchronization accuracy value may be selected.

The method 1400 may also comprise an optional step (not shown in FIG. 14) of quantifying the accumulated synchronization accuracy value into a plurality of levels. Preferably, the quantified level of accumulated synchronization accuracy value for a selected synchronization network element is signaled as a synchronization accuracy value by the first network element to at least one further network element for which the first network element can act as a synchronization candidate network element.

Figure 15:
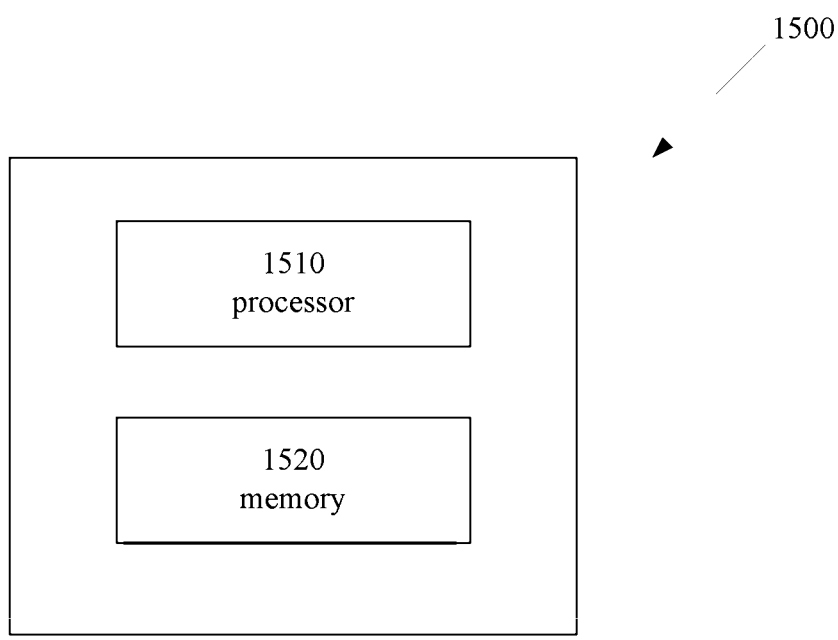
FIG. 15 shows a block diagram of an exemplary apparatus 1500 according to an exemplary embodiment of the present disclosure.

FIG. 15 shows a block diagram of an exemplary apparatus 1500 according to an exemplary embodiment of the present disclosure. The illustration of devices according to FIG. 15 is simplified.

The apparatus 1500 may comprise at least one processor 1510 and at least one memory 1520 storing at least one computer program code. In one embodiment, in response to being executed on the processor, the at least one computer program code may cause the processor to carry out the method steps as mentioned above in blocks 910-980. In another embodiment, in response to being executed on the processor, the at least one computer program code may cause the processor to carry out the steps as mentioned above in blocks 1010-1040. In still another embodiment, in response to being executed on the processor, the at least one computer program code may cause the processor to carry out the steps as mentioned above in blocks 1210-1260. In yet another embodiment, in response to being executed on the processor, the at least one computer program code may cause the processor to carry out the steps as mentioned above in blocks 1410-1450.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

The above examples can be implemented by hardware, software or firmware or a combination thereof. For example, the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules may be implemented as machine readable instructions executable by one or more processors, hardware logic circuitry of the one or more processors or a combination thereof. Further the teachings herein may be implemented in form of a software product. The computer software product is stored in a storage medium and comprises a plurality of instructions for making a computer device (which can be a personal computer, a server or a network device such as a router, switch, access point etc.) implement the method recited in the examples of the present disclosure.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method for network synchronization of a first network element, comprising:
   receiving, from each of at least two synchronization candidate network elements, a first synchronization accuracy value;
   determining, for each of the at least two synchronization candidate network elements, a signal quality indicator;
   determining for each synchronization candidate network element a second synchronization accuracy value based on the signal quality indicator and the first synchronization accuracy value related to the synchronization candidate network element, and
   selecting a synchronizing network element, for synchronizing the first network element to, from the at least two synchronization candidate network elements, based on the determined second synchronization accuracy values, and
   wherein the first synchronization accuracy value is a stratum value of each of the at least two synchronization candidate network elements and wherein the second synchronization accuracy value is a potential stratum value of the first network element.

2. The method according to claim 1, wherein determining the potential stratum value of the first network element comprises:
   determining the potential stratum value of the first network element for a synchronization candidate network element by incrementing the stratum value of the synchronization candidate network element by one if the signal quality indicator is above a threshold; and incrementing the stratum value of the synchronization candidate network element by more than one if the signal quality indicator is below the threshold.

3. The method according to claim 1, wherein determining the potential stratum value of the first network element comprises:
determining the potential stratum value of the first network element for a synchronization candidate network element by incrementing the stratum value of the synchronization candidate network element by a value that depends inversely on a quantized value of the signal quality indicator.

4. An apparatus, comprising:
at least one processor; and
at least one memory including computer program code, where the at least one memory and the computer program code are configured, with the at least one processor, to cause the apparatus to at least:
receive, from each of at least two synchronization candidate network elements, a first synchronization accuracy value;
determine, for each of the at least two synchronization candidate network elements, a signal quality indicator;
determine for each synchronization candidate network element a second synchronization accuracy value based on the signal quality indicator and the first synchronization accuracy value related to the synchronization candidate network element, and
select a synchronizing network element, for synchronizing the first network element to, from the at least two synchronization candidate network elements, based on the determined second synchronization accuracy values, and
wherein the first synchronization accuracy value is a stratum value of each of the at least two synchronization candidate network elements and wherein the second synchronization accuracy value is a potential stratum value of the first network element.

5. The apparatus according to claim 4, wherein the at least one memory including the computer program code is further configured with the at least one processor to cause the apparatus to at least:
determine the potential stratum value of the first network element for a synchronization candidate network element by incrementing the stratum value of the synchronization candidate network element by one if the signal quality indicator is above a threshold; and
increment the stratum value of the synchronization candidate network element by more than one if the signal quality indicator is below the threshold.

6. The apparatus according to claim 4, wherein the at least one memory including the computer program code is further configured with the at least one processor to cause the apparatus to at least:
determine the potential stratum value of the first network element for a synchronization candidate network element by incrementing the stratum value of the synchronization candidate network element by a value that depends inversely on a quantized value of the signal quality indicator.

7. The apparatus according to claim 4, wherein the at least one memory including the computer program code is further configured with the at least one processor to cause the apparatus to at least:
compare the determined potential stratum values of the first network element for different synchronization candidate network elements;
select the synchronization candidate network element with the lowest determined potential stratum value as a synchronization source for the first network element; and
set the stratum value of the first network element to the determined potential stratum value of the first network element for the synchronization candidate network element selected as the synchronization source for the first network element.

8. The apparatus according to claim 4, wherein the first synchronization accuracy value is a synchronization accuracy value of a synchronization candidate network element, and wherein the second synchronization accuracy value is an accumulated synchronization accuracy value taking the first synchronization accuracy value and the signal quality indicator related to the synchronization candidate network element into account.

9. The apparatus according to claim 8, wherein the accumulated synchronization accuracy value for each synchronization candidate network element is determined by summing the received first synchronization accuracy value for the synchronization candidate network element with an individual synchronization error magnitude value estimated from the determined signal quality indicator for the synchronization candidate network element.

10. The apparatus according to claim 9, wherein the individual synchronization error magnitude value is estimated by using a mapping table.

11. The apparatus according to claim 10, wherein different mapping tables are used for different synchronization candidate network element types.

12. The apparatus according to claim 8, the at least one memory including the computer program code is further configured with the at least one processor to cause the apparatus to at least quantify the accumulated synchronization accuracy value into a plurality of levels.

13. The apparatus according to claim 12, wherein the quantified level of accumulated synchronization accuracy value for a selected synchronization network element is signaled as a synchronization accuracy value by the first network element to at least one further network element for which the first network element can act as a synchronization candidate network element.

14. The apparatus according to claim 8, the at least one memory including the computer program code is further configured with the at least one processor to cause the apparatus to at least:
compare the accumulated synchronization accuracy values for the at least two synchronization candidate network elements; and
select the synchronization candidate network element that has the smallest accumulated synchronization accuracy value.

15. The apparatus according to claim 4, wherein the signal quality indicator relates to a signal-noise-ratio (SNR) of the received signal.

16. The apparatus according to claim 4, wherein the first network element comprises a first cell and wherein the at least two synchronization candidate network elements comprises each a candidate cell.

17. The apparatus according to claim 4, wherein the apparatus is used in radio-interface based (RIB) network synchronization.

18. A non-transitory computer program product including a program comprising software code portions being arranged, when run on a processor of an apparatus, to perform at least:
  receiving, from each of at least two synchronization candidate network elements, a first synchronization accuracy value;
  determining, for each of the at least two synchronization candidate network elements, a signal quality indicator;
  determining for each synchronization candidate network element a second synchronization accuracy value based on the signal quality indicator and the first synchronization accuracy value related to the synchronization candidate network element, and
  selecting a synchronizing network element, for synchronizing the first network element to, from the at least two synchronization candidate network elements, based on the determined second synchronization accuracy values, and
  wherein the first synchronization accuracy value is a stratum value of each of the at least two synchronization candidate network elements and wherein the second synchronization accuracy value is a potential stratum value of the first network element.

* * * * *